United States Patent
Li et al.

(10) Patent No.: US 10,254,469 B2
(45) Date of Patent: Apr. 9, 2019

(54) FLEXIBLE DISPLAY PANEL, METHOD OF PREPARING THE SAME AND FLEXIBLE DISPLAY DEVICE

(71) Applicant: BOE Technology Group Co., Ltd., Beijing (CN)

(72) Inventors: Zhao Li, Beijing (CN); Xiaobo Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 15/252,269

(22) Filed: Aug. 31, 2016

(65) Prior Publication Data

US 2017/0269287 A1    Sep. 21, 2017

(30) Foreign Application Priority Data

Mar. 15, 2016  (CN) .......................... 2016 1 0147761

(51) Int. Cl.
  *F21V 8/00* (2006.01)
  *G06F 1/16* (2006.01)
(52) U.S. Cl.
  CPC .......... *G02B 6/0081* (2013.01); *G02B 6/003* (2013.01); *G06F 1/1641* (2013.01); *G06F 1/1652* (2013.01)
(58) Field of Classification Search
  None
  See application file for complete search history.

(56) References Cited

U.S. PATENT DOCUMENTS

| | | |
|---|---|---|
| 7,898,501 B2 | 3/2011 | Jang et al. |
| 8,330,900 B2 | 12/2012 | Kuo et al. |
| 8,797,234 B2 | 8/2014 | Watanabe et al. |
| 2006/0125784 A1 | 6/2006 | Jang et al. |
| 2010/0277665 A1 | 11/2010 | Kuo et al. |
| 2011/0102302 A1 | 5/2011 | Watanabe et al. |
| 2012/0206896 A1 | 8/2012 | Suzuki et al. |
| 2012/0274540 A1 | 11/2012 | Inami et al. |

FOREIGN PATENT DOCUMENTS

| | | |
|---|---|---|
| CN | 1790108 A | 6/2006 |
| CN | 102067197 A | 5/2011 |
| CN | 105228335 A | 1/2016 |
| TW | 201039014 A | 11/2010 |

OTHER PUBLICATIONS

First Office Action, including Search Report, for Chinese Patent Application No. 201610147761.9, dated Feb. 28, 2018, 11 pages.

*Primary Examiner* — Elmito Breval

(74) *Attorney, Agent, or Firm* — Westman, Champlin & Koehler, P.A.

(57) ABSTRACT

The present disclosure relates to a field of display device and provides a flexible display panel, a method of preparing the same and a flexible display device. The flexible display panel includes: at least two sub-flexible display panels, each two adjacent sub-flexible display panels being connected together through a folding mechanism therebetween, the flexible display panel further including a flexible light guide structure that at least covers the folding mechanism, the flexible light guide structure being configured to emit a portion of light emitted from each sub-flexible display panel out of a portion of the flexible light guide structure that corresponds to the folding mechanism.

18 Claims, 1 Drawing Sheet

FLEXIBLE DISPLAY PANEL, METHOD OF PREPARING THE SAME AND FLEXIBLE DISPLAY DEVICE

CROSS-REFERENCE TO RELATED APPLICATIONS

This application claims priority to Chinese Patent Application No. 201610147761.9, filed on Mar. 15, 2016, entitled with "Flexible Display, Method of Preparing the same and Flexible Display Device", which is incorporated herein by reference in its entirety.

BACKGROUND OF THE INVENTION

The present disclosure generally relates to a field of display technology, and in particular to a flexible display panel, a method of preparing the same and a flexible display device.

With the continuous development of a flexible display, the display having a folding function is more and more popular. The foldable display may not only meet the requirement of the user for a large screen, but also meet the requirement of the user for portability.

However, the current foldable flexible display is problematic for the following reasons. The requirement for bending radius of allowable bending of the flexible display panel which is located in a folding area is high. Further, in the case that there is an equal curvature radius for the flexible display panels, if the folding radius of the flexible display panel in the folding area is set to be small, bending force which the flexible display panel is subject to will be large and the flexible display panel will be prone to be damaged. If the folding radius of the flexible display panel in the folding area is set to be large, the appearance and using effect of the whole display will be affected, though the bending force which the flexible display panel is subject to becomes small.

SUMMARY OF THE INVENTION

The present disclosure provides a flexible display panel including: at least two sub-flexible display panels, each two adjacent sub-flexible display panels being connected together through a folding mechanism therebetween, the flexible display panel further including:

a flexible light guide structure that at least covers the folding mechanism, wherein light is emitted from each sub-flexible display panel, and wherein the flexible light guide structure is configured such that a portion of the light is then emitted out of a portion of the flexible light guide structure that corresponds to the folding mechanism.

The present disclosure further provides a method of preparing any one of the above flexible display panels, including:

connecting two adjacent sub-flexible display panels together by a folding mechanism, respectively; and forming a flexible light guide structure that at least covers the folding mechanism, wherein light is emitted from each sub-flexible display panel, and wherein the flexible light guide structure is configured such that a portion of the light is then emitted out of a portion of the flexible light guide structure that corresponds to the folding mechanism.

The present disclosure further provides a flexible display device including any one of the above flexible display panels.

BRIEF DESCRIPTION OF THE DRAWINGS

The drawings described herein, which form a part of the present disclosure, are intended to provide a further understanding on the present disclosure. The exemplary embodiments of the present invention and the description thereof are intended to explain the present disclosure and not to improperly limit the present disclosure. In the drawings.

Figure 1:
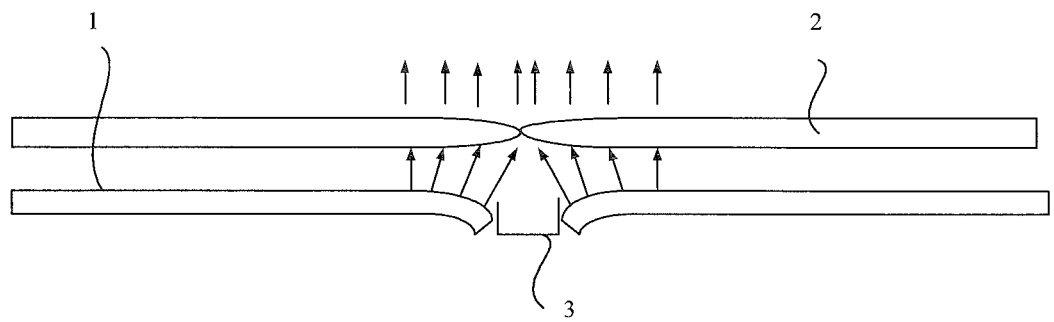
FIG. 1 is a schematic diagram of structure of a flexible display panel according to an embodiment of the invention.

In the drawings:
1—sub-flexible display panel
2—flexible light guide structure
3—folding mechanism

DETAILED DESCRIPTION OF EMBODIMENTS

The present disclosure provides a flexible display panel, a method of preparing the same and a flexible display device in order to improve display effect of the flexible display device and reduce damage to the flexible display device caused by being folded.

With the flexible display panel according to the present disclosure, it is not necessary for the sub-flexible display panels to bend when the flexible display panel is folded. Folding the flexible display panel may be achieved by the folding mechanism provided between two sub-flexible display panels. As such, when the flexible display panel is folded, the sub-flexible display panels can be prevented from being damaged due to small folding radius of the flexible display panel. Meanwhile, by providing the flexible light guide structure that at least covers the folding mechanism, a portion of light emitted from each sub-flexible display panel may be emitted out of a portion of the flexible light guide structure that corresponds to the folding mechanism. Therefore, light can be emitted from a position that corresponds to the folding mechanism of the flexible display panel and a proper display of the flexible display panel can be achieved.

Therefore, the flexible display panel according to the present disclosure may improve display effect of the flexible display device and reduce damage to the flexible display device caused by being folded.

In some alternative embodiments, the flexible light guide structure covers each sub-flexible display panel and the folding mechanism. This makes emission surface of the flexible display panel flat when the flexible display panel is in an unfolded state, which may further improve the display effect of the flexible display panel.

In some alternative embodiments, a direction in which the light is emitted from a portion of the flexible light guide structure that corresponds to the folding mechanism is perpendicular to a display surface of the flexible display panel. This may further improve the display effect of the flexible display panel.

In some alternative embodiments, another portion of light emitted from each sub-flexible display panel may be emitted in an emitting direction out of a portion of the flexible light guide structure that corresponds to the respective sub-flexible display panel, and the emitting direction is perpendicular to the display surface of the flexible display panel. This may provide a uniform brightness of the emission surface of the flexible display panel.

In some alternative embodiments, the portion of the flexible light guide structure that corresponds to the folding mechanism is a convex lens that projects in a direction away from the sub-flexible display panels. The portion of the flexible light guide structure that corresponds to the respective sub-flexible display panel is a planar lens. Focal length and radius of the convex lens can be determined according to actual requirements. Of course, the flexible light guide structure is not limited to a convex lens, and may be a prism or the like, which will not be described in detail here.

In some alternative embodiments, the convex lens is of a split structure, and the convex lens includes sub-convex lenses the number of which is same as that of the sub-flexible display panels. When the flexible display panel is in a unfolded state, two adjacent ends of any two adjacent sub-convex lenses that are opposite to each other are in contact with each other to form a coincident line, and the coincident line is located above the folding mechanism. Such an arrangement facilitates bending the flexible display panel.

In some alternative embodiments, bending radius of the flexible light guide structure is equal to bending radius of respective sub-flexible display panel.

In some alternative embodiments, when the flexible display panel is folded, bending radius of the portion of the flexible light guide structure that corresponds to the folding mechanism is equal to bending radius of the folding mechanism.

The solutions according to embodiments of the present invention will be clearly and completely described in connection with the accompanying drawings according to embodiments of the invention. It is apparent that the described embodiments are only part of the embodiments of the present invention and not all the embodiments.

FIG. 1 is a schematic diagram of structure of a flexible display panel according to an embodiment of the invention. It should be noted that the flexible display panel shown in FIG. 1 according to an embodiment of the present invention only includes two sub-flexible display panels and one folding mechanism 3. The solution shown in FIG. 1 is just an embodiment and will not limit the flexible display panel according to the present disclosure to only include two sub-flexible display panels 1 and one folding mechanism 3.

The present disclosure provides a flexible display panel including: at least two sub-flexible display panels 1, each two adjacent sub-flexible display panels being connected together through a folding mechanism 3, the flexible display panel further including:

a flexible light guide structure 2 that at least covers the folding mechanism 3, wherein light is emitted from each sub-flexible display panel, and wherein the flexible light guide structure 2 is configured such that a portion of the light is then emitted out of a portion of the flexible light guide structure 2 that corresponds to the folding mechanism.

With the flexible display panel according to the present disclosure, it is not necessary for the sub-flexible display panels 1 to bend when the flexible display panel is folded. Folding the flexible display panel may be achieved by the folding mechanism 3 provided between two sub-flexible display panels 1. As such, the sub-flexible display panel can be prevented from being damaged when folding radius of the flexible display panel is set to be small. Meanwhile, by providing the flexible light guide structure 2 that at least covers the folding mechanism 3, a portion of light emitted from each sub-flexible display panel 1 may be emitted out of a portion of the flexible light guide structure 2 that corresponds to the folding mechanism. Therefore, light can be emitted from a position corresponds to the folding mechanism 3 of the flexible display panel and a proper display of the flexible display panel can be achieved.

Therefore, the flexible display panel according to the present disclosure may improve display effect of the flexible display device and reduce damage to the flexible display device caused by being folded.

The specific dimensions of the above flexible light guide structure 2 can be determined according to actual requirements. In an alternative embodiment of the present invention, the flexible light guide structure 2 covers each sub-flexible display panel 1 and the folding mechanism 3. On one hand, such an arrangement will facilitate manufacture. On the other hand, such an arrangement will further improve the display effect of the flexible display panel.

The flexible light guide structure 2 according to the present disclosure plays a role of refracting the light emitted from the sub-flexible display panels 1. The specific refractive angle can be adjusted according to the own refractive index of the preparation material of the flexible light guide structure 2. In a preferred embodiment, a direction in which light is emitted from a portion of the flexible light guide structure 2 that corresponds to the folding mechanism is perpendicular to the display surface of the flexible display panel. This may further improve the display effect of the flexible display panel.

Further, another portion of light emitted from each sub-flexible display panel may be emitted in an emitting direction out of a portion of the flexible light guide structure 2 that corresponds to the respective sub-flexible display panel, and the emitting direction is perpendicular to the display surface of the flexible display panel. This may provide a uniform brightness of the emission surface of the flexible display panel.

Specific shape of the flexible light guide structure 2 descried above may be of any of a variety of shapes, as long as the flexible light guide structure 2 can play the role of refracting a portion of the light from the sub-flexible display panels to a position above the folding mechanism 3. In an alternative embodiment, the portion of the flexible light guide structure 2 that corresponds to the folding mechanism is a convex lens that projects in a direction away from the sub-flexible display panels. The portion of the flexible light guide structure 2 that corresponds to the respective sub-flexible display panel is a planar lens. Focal length and radius of the convex lens can be determined according to actual requirements. Of course, the flexible light guide structure 2 is not limited to a convex lens, and may be a prism or the like, which will not be described in detail here. In an alternative embodiment, the convex lens further projects in a direction toward the respective sub-flexible display panel.

The flexible light guide structure 2 descried above may be an integral convex lens or may be a split convex lens. Alternatively, the convex lens is of a split structure, and the convex lens includes sub-convex lenses the number of which is same as that of the sub-flexible display panels 1. When the flexible display panel is in the unfolded state, two adjacent ends of any two adjacent sub-convex lenses that are opposite to each other are in contact with each other to form a coincident line, and the coincident line is located above the folding mechanism 3. Such an arrangement facilitates bending the flexible display panel. When folding the flexible display panel, two side plates of the two convex lenses opposite to each other may be separated, which causes the flexible display panel to be more prone to be folded.

Preferably, bending radius of the portion of the flexible light guide structure 2 that corresponds to the folding mechanism is equal to bending radius of the folding mechanism.

The flexible light guide structure 2 according to the present disclosure can be fixed to the sub-flexible display panel 1 in a variety of ways. Alternatively, the flexible light guide structure 2 is bonded to each of the sub-flexible display panels 1 by flexible adhesive. Of course, a frame support structure may be provided such that the flexible light guide structure 2 can be fixed above the sub-flexible display panels 1 by the frame.

Figure 2:
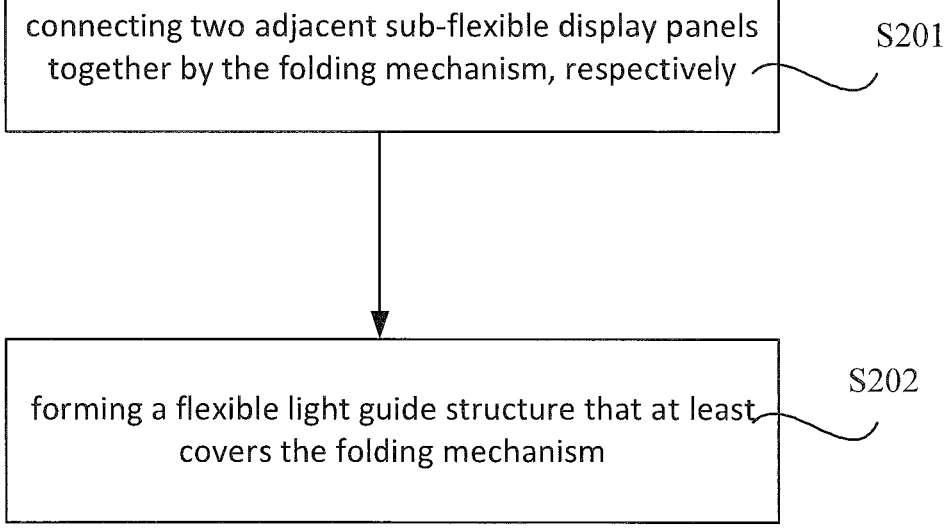
FIG. 2 is a flow chart of a method of preparing a flexible display panel according to an embodiment of the present invention.

FIG. 2 is a flow chart of a method of preparing a flexible display panel according to an embodiment of the present invention.

The present disclosure further provides a method of preparing any one of the above flexible display panels, including:

step S201: connecting two adjacent sub-flexible display panels 1 together by the folding mechanism 3, respectively; and step S202: forming a flexible light guide structure 2 that at least covers the folding mechanism 3, wherein light is emitted from each sub-flexible display panel 1, and wherein the flexible light guide structure 2 is configured such that a portion of the light is then emitted out of a portion of the flexible light guide structure 2 that corresponds to the folding mechanism.

In the case that a flexible display panel is prepared by means of a method of preparing a flexible display panel according to the present disclosure, folding the flexible display panel may be achieved by the folding mechanism 3 provided between two sub-flexible display panels 1 without bending the sub-flexible display panels 1. As such, when the flexible display panel is folded, the sub-flexible display panels can be prevented from being damaged due to small bending radius of the flexible display panel. Meanwhile, by providing the flexible light guide structure 2 that at least covers the folding mechanism 3, a portion of light emitted from each sub-flexible display panel 1 may be emitted out of a portion of the flexible light guide structure 2 that corresponds to the folding mechanism. Therefore, light can be emitted from a position that corresponds to the folding mechanism 3 of the flexible display panel.

Therefore, the method of preparing a flexible display panel according to the present disclosure may improve display effect of the flexible display device and reduce damage to the flexible display device caused by being folded.

The specific dimensions of the above flexible light guide structure 2 can be determined according to actual requirements. In an alternative embodiment of the present invention, when preparing the flexible display panel, the flexible light guide structure 2 covers each sub-flexible display panel 1 and the folding mechanism 3. Such an arrangement will facilitate manufacture and further improve the display effect of the flexible display panel.

The present disclosure further provides a flexible display device including any one of the above flexible display panels. Since the above display panel may improve display effect of the flexible display device and reduce damage to the flexible display device caused by being folded, the flexible display device according to the present disclosure presents a good display effect and practicality.

Obviously, those skilled in the art can make various changes and modifications to the present disclosure without departing from the spirit and scope of the disclosure. Thus, if these modifications and variations of the present disclosure fall within the scope of the claims of the disclosure and equivalents thereof, the present disclosure is also intended to encompass such changes and modifications.

What is claimed is:

1. A flexible display panel comprising: at least two sub-flexible display panels, each two adjacent sub-flexible display panels being connected together through a folding mechanism therebetween, wherein the flexible display panel further comprising:

a flexible light guide structure that at least covers the folding mechanism, wherein light is emitted from each sub-flexible display panel, and wherein the flexible light guide structure is configured such that a portion of the light is then emitted out of a portion of the flexible light guide structure that corresponds to the folding mechanism, wherein a portion of the flexible light guide structure that corresponds to the folding mechanism is a convex lens that projects in a direction away from the sub-flexible display panels, and the portion of the flexible light guide structure that corresponds to the respective sub-flexible display panel is a planar lens.

2. The flexible display panel according to claim 1, wherein the flexible light guide structure covers each sub-flexible display panel and the folding mechanism.

3. The flexible display panel according to claim 2, wherein a direction in which the light is emitted from a portion of the flexible light guide structure that corresponds to the folding mechanism is perpendicular to a display surface of the flexible display panel.

4. The flexible display panel according to claim 2, wherein another portion of light emitted from each sub-flexible display panel is emitted in an emitting direction out of a portion of the flexible light guide structure that corresponds to the respective sub-flexible display panel, and the emitting direction is perpendicular to a display surface of the flexible display panel.

5. The flexible display panel according to claim 2, wherein the flexible light guide structure is bonded to each of the sub-flexible display panels by flexible adhesive.

6. The flexible display panel according to claim 1, wherein the convex lens is of a split structure, and the convex lens comprises sub-convex lenses the number of which is same as that of the sub-flexible display panels, and wherein when the flexible display panel is in an unfolded state, two adjacent ends of any two adjacent sub-convex lenses that are opposite to each other are in contact with each other to form a coincident line, and the coincident line is located above the folding mechanism.

7. The flexible display panel according to claim 6, wherein the flexible light guide structure covers each sub-flexible display panel and the folding mechanism.

8. The flexible display panel according to claim 7, wherein a direction in which the light is emitted from a portion of the flexible light guide structure that corresponds to the folding mechanism is perpendicular to a display surface of the flexible display panel.

9. The flexible display panel according to claim 7,
wherein another portion of light emitted from each sub-flexible display panel is emitted in an emitting direction out of a portion of the flexible light guide structure that corresponds to the respective sub-flexible display panel, and the emitting direction is perpendicular to a display surface of the flexible display panel.

10. The flexible display panel according to claim 1,
wherein when the flexible display panel is folded, bending radius of a portion of the flexible light guide structure that corresponds to the folding mechanism is equal to bending radius of the folding mechanism.

11. A method of preparing a flexible display panel according to claim 1, comprising:
connecting two adjacent sub-flexible display panels together by a folding mechanism, respectively; and
forming a flexible light guide structure that at least covers the folding mechanism,
wherein light is emitted from each sub-flexible display panel, and
wherein the flexible light guide structure is configured such that a portion of the light is then emitted out of a portion of the flexible light guide structure that corresponds to the folding mechanism.

12. The method according to claim 11,
wherein the flexible light guide structure covers each sub-flexible display panel and the folding mechanism.

13. The method according to claim 12,
wherein a direction in which the light is emitted from a portion of the flexible light guide structure that corresponds to the folding mechanism is perpendicular to a display surface of the flexible display panel.

14. The method according to claim 12,
wherein another portion of light emitted from each sub-flexible display panel is emitted in an emitting direction out of a portion of the flexible light guide structure that corresponds to the respective sub-flexible display panel, and the emitting direction is perpendicular to a display surface of the flexible display panel.

15. A flexible display device, comprising a flexible display panel according to claim 1.

16. The flexible display panel according to claim 1,
wherein the flexible light guide structure covers each sub-flexible display panel and the folding mechanism.

17. The flexible display panel according to claim 16,
wherein a direction in which the light is emitted from a portion of the flexible light guide structure that corresponds to the folding mechanism is perpendicular to a display surface of the flexible display panel.

18. The flexible display panel according to claim 16,
wherein another portion of light emitted from each sub-flexible display panel is emitted in an emitting direction out of a portion of the flexible light guide structure that corresponds to the respective sub-flexible display panel, and the emitting direction is perpendicular to a display surface of the flexible display panel.

* * * * *